(12) United States Patent
Amano (10) Patent No.: US 11,679,621 B2
(45) Date of Patent: Jun. 20, 2023

(54) VEHICLE WHEEL

(71) Applicant: CENTRAL MOTOR WHEEL CO., LTD., Anjo (JP)

(72) Inventor: Takanori Amano, Okazaki (JP)

(73) Assignee: CENTRAL MOTOR WHEEL CO., LTD., Anjo (JP)

(*) Notice: Subject to any disclaimer, the term of this patent is extended or adjusted under 35 U.S.C. 154(b) by 259 days.

(21) Appl. No.: 17/120,652

(22) Filed: Dec. 14, 2020

(65) Prior Publication Data

US 2021/0221169 A1 Jul. 22, 2021

(30) Foreign Application Priority Data

Jan. 20, 2020 (JP) ............................. JP2020-006798

(51) Int. Cl.
*B60B 3/00* (2006.01)
*B60B 3/10* (2006.01)

(52) U.S. Cl.
CPC ............. *B60B 3/007* (2013.01); *B60B 3/10* (2013.01)

(58) Field of Classification Search
CPC ........... B60B 3/007; B60B 3/10; B60B 3/002; B60B 3/06; B60B 3/12; B60B 1/06; B60B 1/08
See application file for complete search history.

(56) References Cited

U.S. PATENT DOCUMENTS

| | | | | |
|---|---|---|---|---|
| 1,090,743 A | * | 3/1914 | Morat | ........................ B60B 1/08 |
| | | | | D12/205 |
| 1,544,242 A | * | 6/1925 | Lavery | ....................... B60B 1/08 |
| | | | | 301/65 |
| 3,746,399 A | * | 7/1973 | Verdier | ..................... B60B 3/06 |
| | | | | 301/65 |
| 2001/0026094 A1 | * | 10/2001 | Bhambra | .................. B60B 1/08 |
| | | | | 301/65 |
| 2016/0152069 A1 | * | 6/2016 | Pieronek | ................... B60B 7/02 |
| | | | | 301/37.101 |
| 2016/0361946 A1 | | 12/2016 | Imai et al. | |

(Continued)

FOREIGN PATENT DOCUMENTS

| | | | | |
|---|---|---|---|---|
| DE | 10130450 A1 | * | 1/2003 | ............. B60B 3/044 |
| DE | 10132005 A1 | | 1/2003 | |
| EP | 0546307 A1 | * | 6/1993 | ............... B60B 3/06 |

(Continued)

OTHER PUBLICATIONS

Machine Translation of EP 0546307 A1, 4 pages (Year: 1993).*
Machine Translation of DE 10130450 A1, 6 pages (Year: 2003).*

*Primary Examiner* — S. Joseph Morano
*Assistant Examiner* — Emily G. Castonguay
(74) *Attorney, Agent, or Firm* — Oliff PLC (57) ABSTRACT

A vehicle wheel includes a hub portion, a rim portion, and a disc portion. The disc portion is arranged such that a window portion, a spoke portion, and a thin plate portion do not overlap when viewed from a wheel axis direction. The thin plate portion is connected to at least a part of the hub portion, the rim portion, and the spoke portion via a connection portion. A cross-sectional area of the connection portion that appears when the connection portion is cut in a wheel radial direction changes such that a cross-sectional area of an end of the connection portion becomes smaller than a cross-sectional area of another portion of the connection portion.

4 Claims, 6 Drawing Sheets

(56) References Cited

U.S. PATENT DOCUMENTS

2021/0221168 A1* 7/2021 Amano ................ B60B 3/007

FOREIGN PATENT DOCUMENTS

| EP | 2208621 A1 | 7/2010 |
| JP | 2012-224136 A | 11/2012 |
| JP | 2017-001549 A | 1/2017 |
| JP | 2018-020640 A | 2/2018 |

* cited by examiner

VEHICLE WHEEL

CROSS-REFERENCE TO RELATED APPLICATION

This application claims priority to Japanese Patent Application No. 2020-006798 filed on Jan. 20, 2020, incorporated herein by reference in its entirety.

BACKGROUND

1. Technical Field

The present disclosure relates to a vehicle wheel that is integrally molded by casting and has a plurality of spoke portions in a disc portion and a window portion defined between each spoke portion.

2. Description of Related Art

Conventionally, the technique described in Japanese Unexamined Patent Application Publication No. 2017-1549 (JP 2017-1549 A) is known as a vehicle wheel of this type. In the vehicle wheel, a plurality of spoke portions are provided on a disc portion extending between a hub portion and a rim portion, and a window portion is defined between two adjacent spoke portions. A thin plate portion thinner than the spoke portion is provided on the rim portion so as to project over the window portion, and a part of the window portion is shielded by the thin plate portion.

SUMMARY

When the vehicle wheel is formed such that the rim portion and the thin plate portion that have a large difference in thickness are integrated by casting, wrinkles due to casting tend to be generated at a boundary portion between the rim portion and the thin plate portion on the front side surface of the vehicle wheel. Thus, it is conceivable to mold the vehicle wheel such that the thickness of the connection portion connecting the rim portion and the thin plate portion is thicker toward the rim portion side and thinner toward the thin plate portion. In the vehicle wheel thus formed, since the difference in the thickness between the rim portion and the thin plate portion gradually changes due to the connection portion, the generation of wrinkles caused by casting can be expected to be suppressed.

However, in the case of a vehicle wheel in which the thin plate portion partially shields the window portion, when a peripheral edge of the thin plate portion is visually recognized through the window portion, the end of the connection portion in which the thickness difference gradually changes is conspicuous. Thus, it is assumed that the design of the vehicle wheel will be adversely affected.

In the present disclosure, the adverse effect of the connection portion on the design can be suppressed.

An aspect of the present disclosure is a vehicle wheel. The vehicle wheel includes a hub portion attached to the vehicle, a rim portion having a substantially cylindrical shape, and a disc portion connected to a front side of the rim portion and the hub portion. The hub portion, the rim portion, and the disc portion are integrated by casting. In the disc portion, a window portion extending through in a wheel axis direction, a spoke portion connected to the hub portion and the rim portion, and a thin plate portion of which a thickness in the wheel axis direction is thinner than a thickness of the spoke portion, are disposed so as to not overlap when seen from the wheel axis direction. The thin plate portion is connected to at least a part of the hub portion, the rim portion, and the spoke portion via a connection portion. In the connection portion, a thickness of a side connected to at least a part of the hub portion, the rim portion, and the spoke portion is thicker than a thickness of a side connected to the thin plate portion, and an end of the connection portion is exposed from the window portion. A cross-sectional area of the connection portion that appears when the connection portion is cut in a wheel radial direction changes such that a cross-sectional area of an end of the connection portion becomes smaller than a cross-sectional area of another portion of the connection portion.

With the above configuration, the connection portion that is difficult to visually recognize when mounted on the vehicle is formed to be relatively large to suppress the generation of wrinkles, and the end of the connection portion that is exposed to the window portion to be easily visually recognizable when mounted on the vehicle is formed to be relatively small so as to make the connection inconspicuous. Therefore, it is possible to suppress the adverse effect of the connection portion on the design of the vehicle wheel.

In the vehicle wheel, the cross-sectional area of the connection portion may increase as the distance from the window portion increases.

Further, in the vehicle wheel, the front side of the connection portion may be flat.

With the above configuration, the connection portion that is difficult to visually recognize when mounted on the vehicle is formed to be relatively large to suppress the generation of wrinkles, and the end of the connection portion that is exposed to the window portion to be easily visually recognizable when mounted on the vehicle is formed to be relatively small so as to make the connection inconspicuous. Therefore, it is possible to suppress the adverse effect of the connection portion on the design of the vehicle wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One Embodiment

Figure 1:
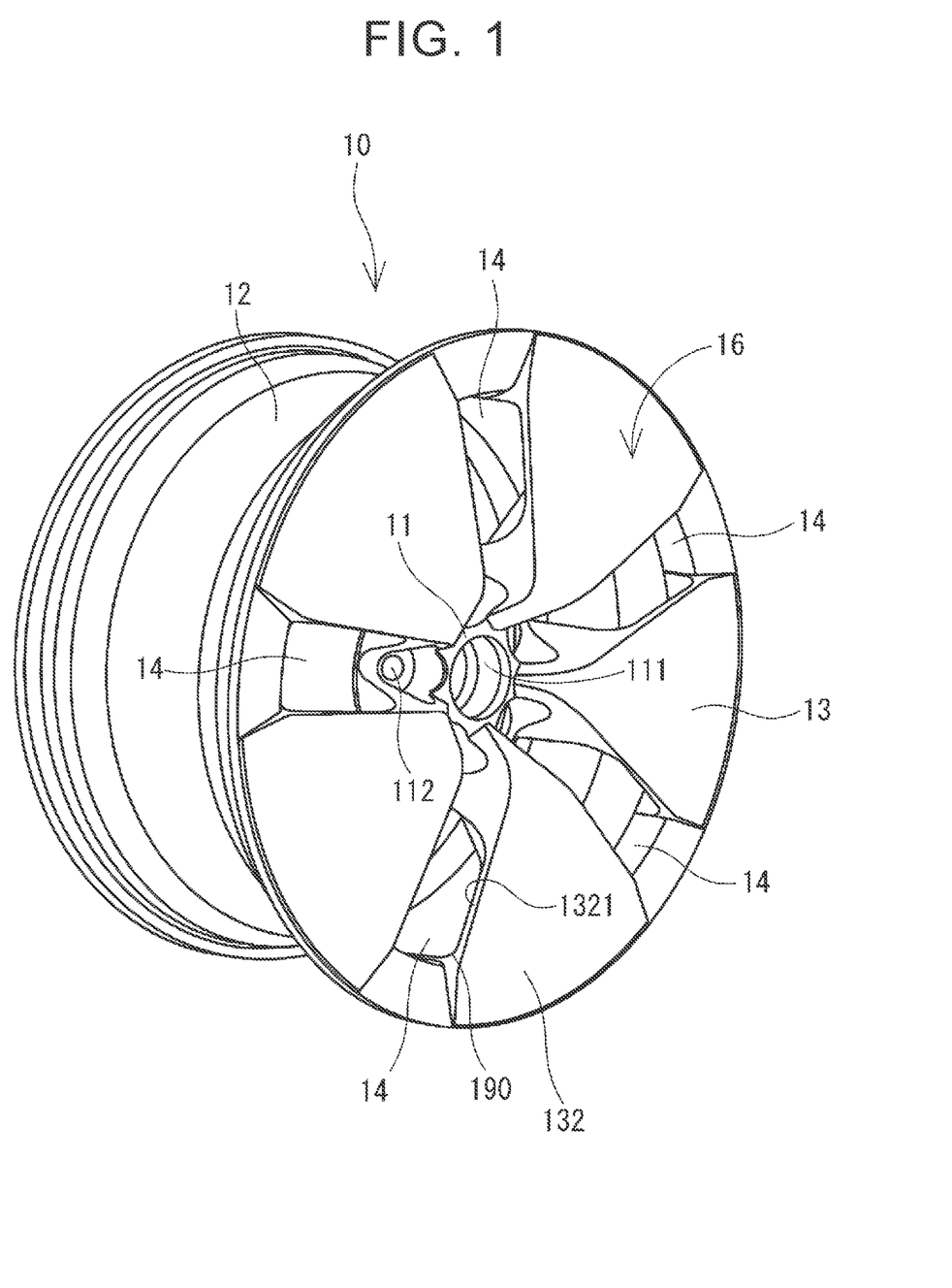
FIG. 1 is a perspective view of a vehicle wheel as viewed from the front side, of an embodiment of the present disclosure.
Figure 2:
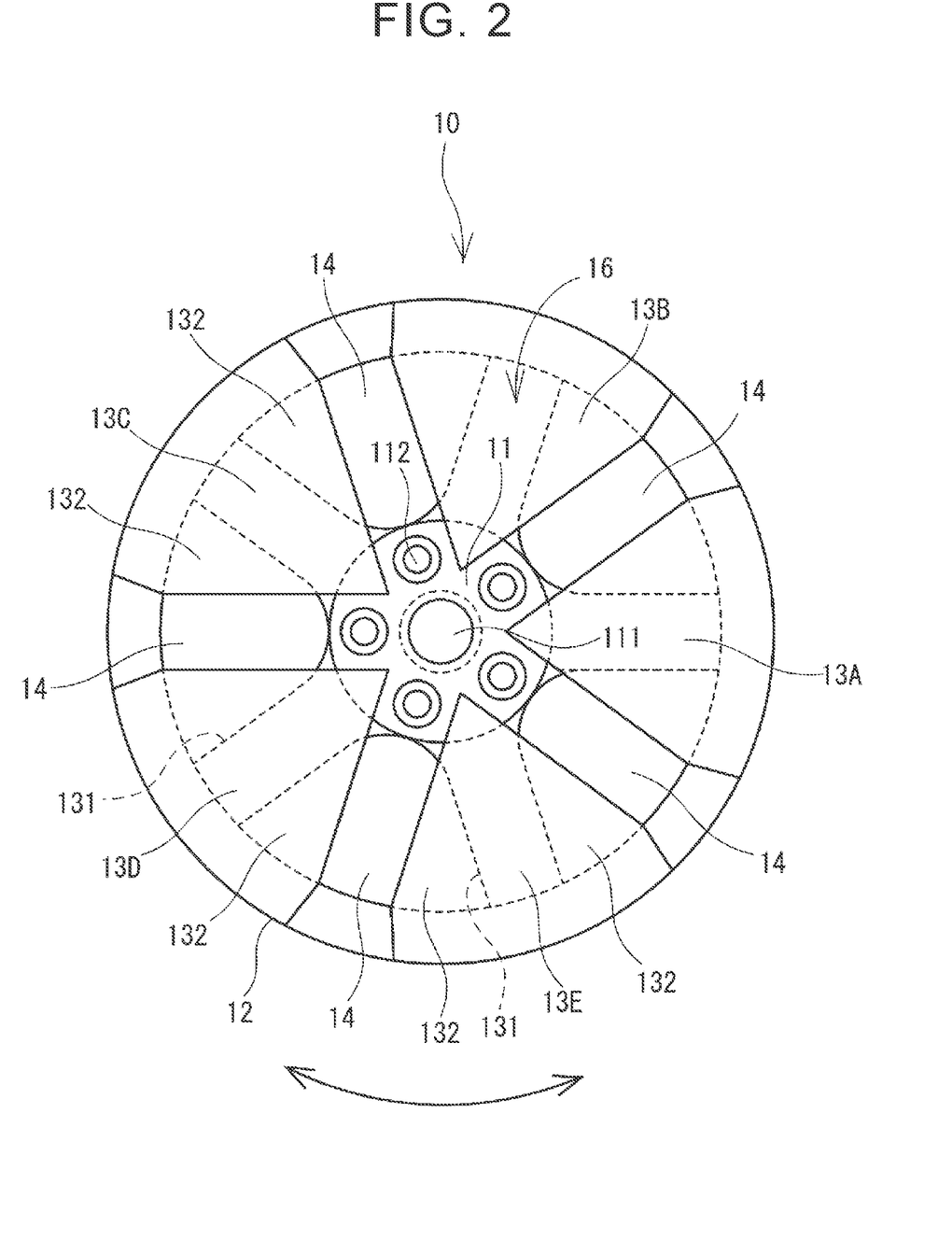
FIG. 2 is a front view of the vehicle wheel.

Hereinafter, one embodiment in which the present disclosure is embodied in a vehicle wheel made of aluminum alloy equipped in an automobile will be described with reference to the drawings. As shown in FIGS. 1 and 2, a vehicle wheel 10 of the present embodiment has a hub portion 11 attached to an axle (not shown) of an automobile, a cylindrical rim portion 12 on which a tire is mounted, and a disc portion 13 connected to a front side of the rim portion 12 and the hub portion 11, and the whole vehicle wheel 10 is integrally formed by casting.

The hub portion 11 is provided with a hub hole 111 and bolt hole 112. The disc portion 13 has five spoke portions 131 connected to the hub portion 11 and the rim portion 12, and a thin plate portion 132 that projects from a front side surface of each spoke portion 131 to both sides in a wheel circumferential direction (arrow direction in FIG. 2). Between the two thin plate portions 132 adjacent to each other in the wheel circumferential direction, a strip-shaped window portion 14 having an opening that is long in the wheel radial direction is formed so as to extend through in an axial direction of the vehicle wheel 10 (long dashed short dashed line direction in FIG. 5).

In this embodiment, five window portions 14 are defined in the disc portion 13. When the vehicle wheel 10 is viewed from a front side (a side surface side of the vehicle) (see FIG. 1), the disc portion 13 is divided into five substantially triangular segments 13A to 13E (see FIG. 2) by the window portions 14, and a design surface 16 of the vehicle wheel 10 is configured by an assembly of the segments.

Figure 3:
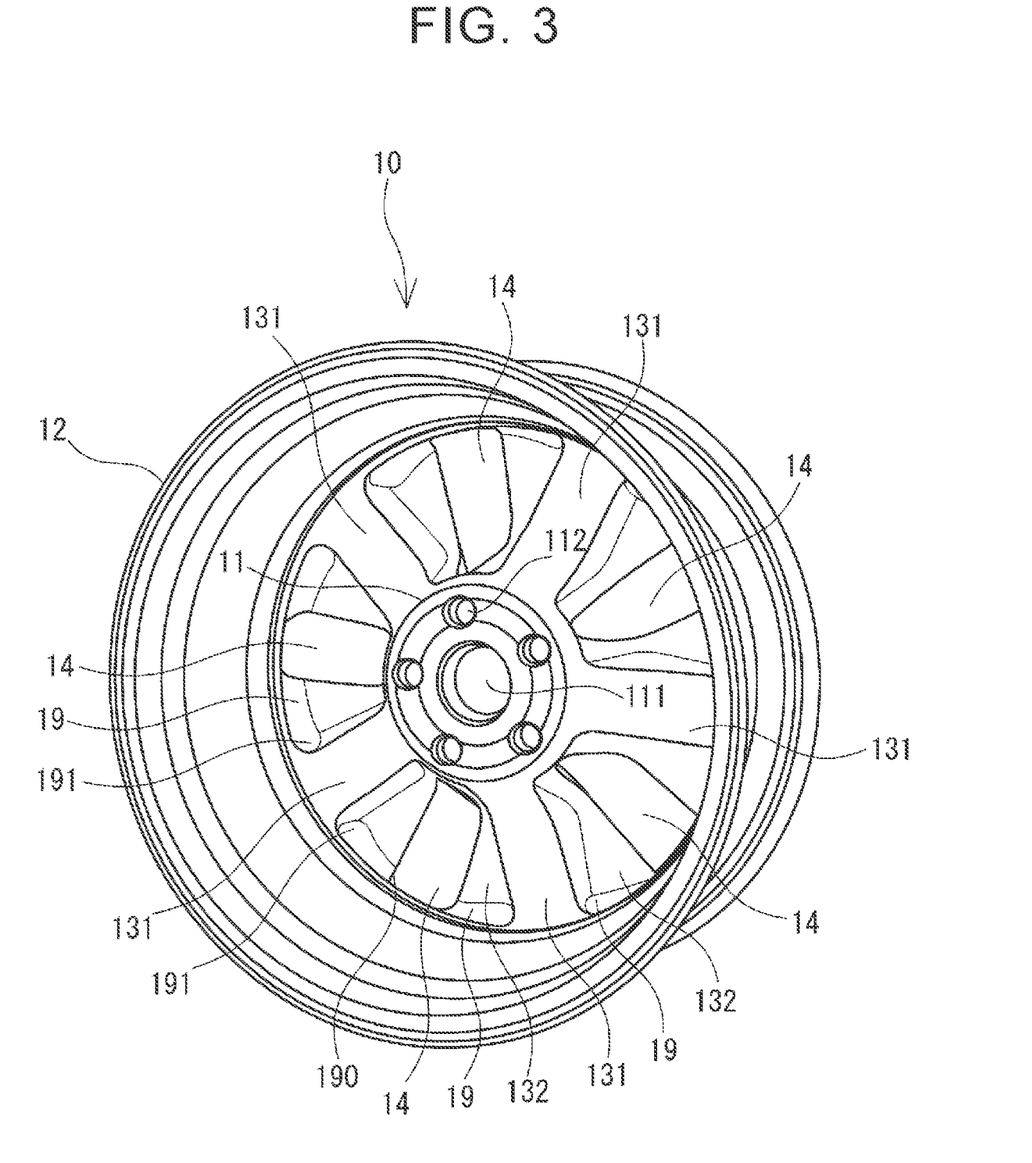
FIG. 3 is a perspective view of the vehicle wheel as viewed from the rear side.
Figure 5:
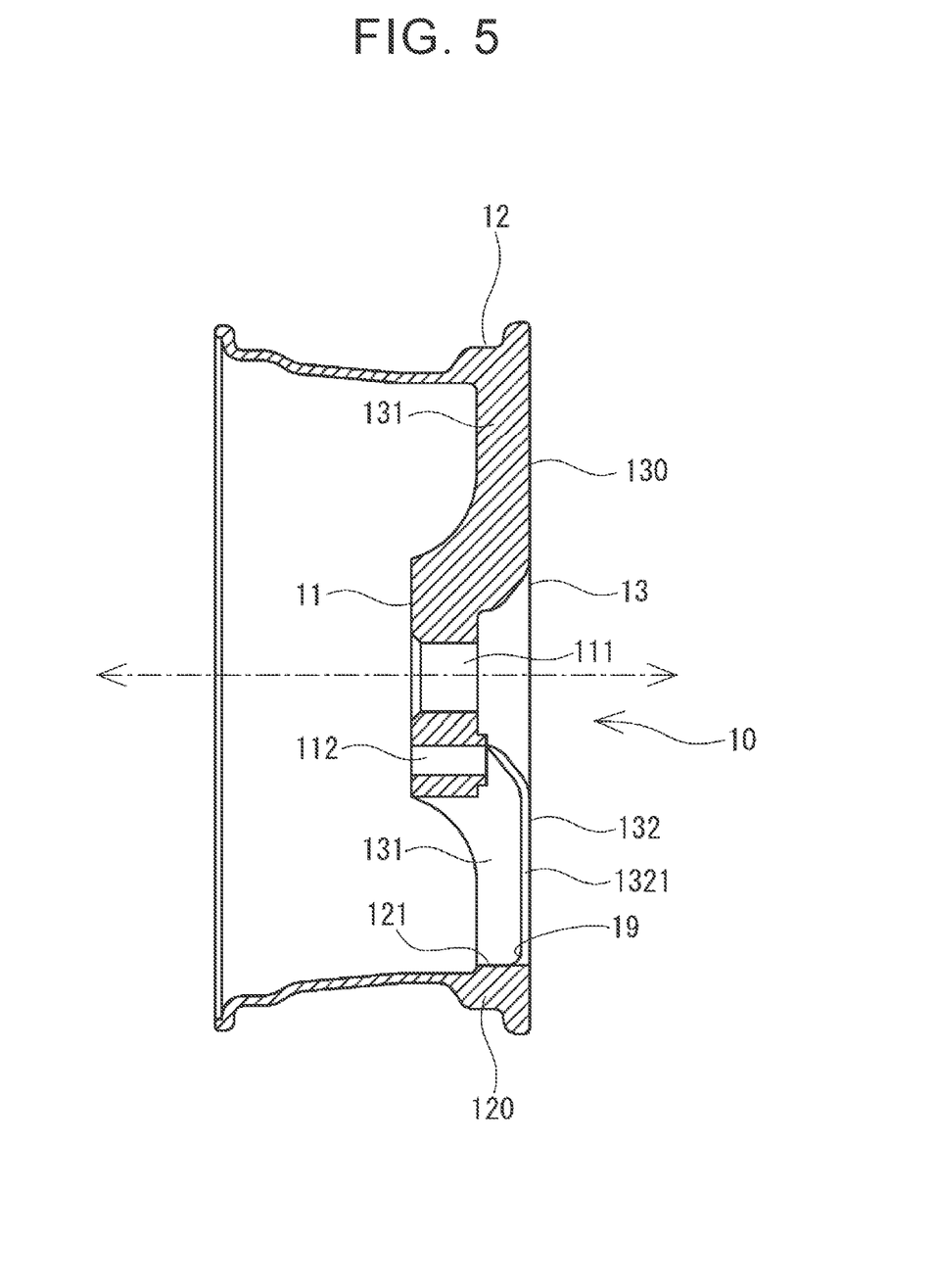
FIG. 5 is a cross-sectional view taken along line V-V of FIG. 4.

As shown in FIGS. 3 and 5, the spoke portions 131 of the disc portion 13 are formed to be relatively thick in a wheel axis direction in consideration of the overall rigidity of the vehicle wheel 10. In contrast, the thin plate portion 132 is formed thinner than the spoke portion 131 in consideration of the overall design of the vehicle wheel 10. The window portion 14, the spoke portion 131, and the thin plate portion 132 are arranged so as not to overlap when viewed from the wheel axis direction.

Further, in the wheel axis direction, a front side of the thin plate portion 132 is formed at the same height as the front side of the rim portion 12, and a front side surface 130 of the entire disc portion 13 is a smooth surface having no step in the wheel circumferential direction.

An inner end portion of the thin plate portion 132 in the wheel radial direction is integrally connected to the hub portion 11 and the spoke portions 131. Further, an outer end portion of the thin plate portion 132 in a wheel radial direction is integrally connected to a front side flange 120 of the rim portion 12 via the connection portion 19. A front side of the connection portion 19 is formed flat at the same height as the front side of the thin plate portion 132 and the rim portion 12.

Figure 4:
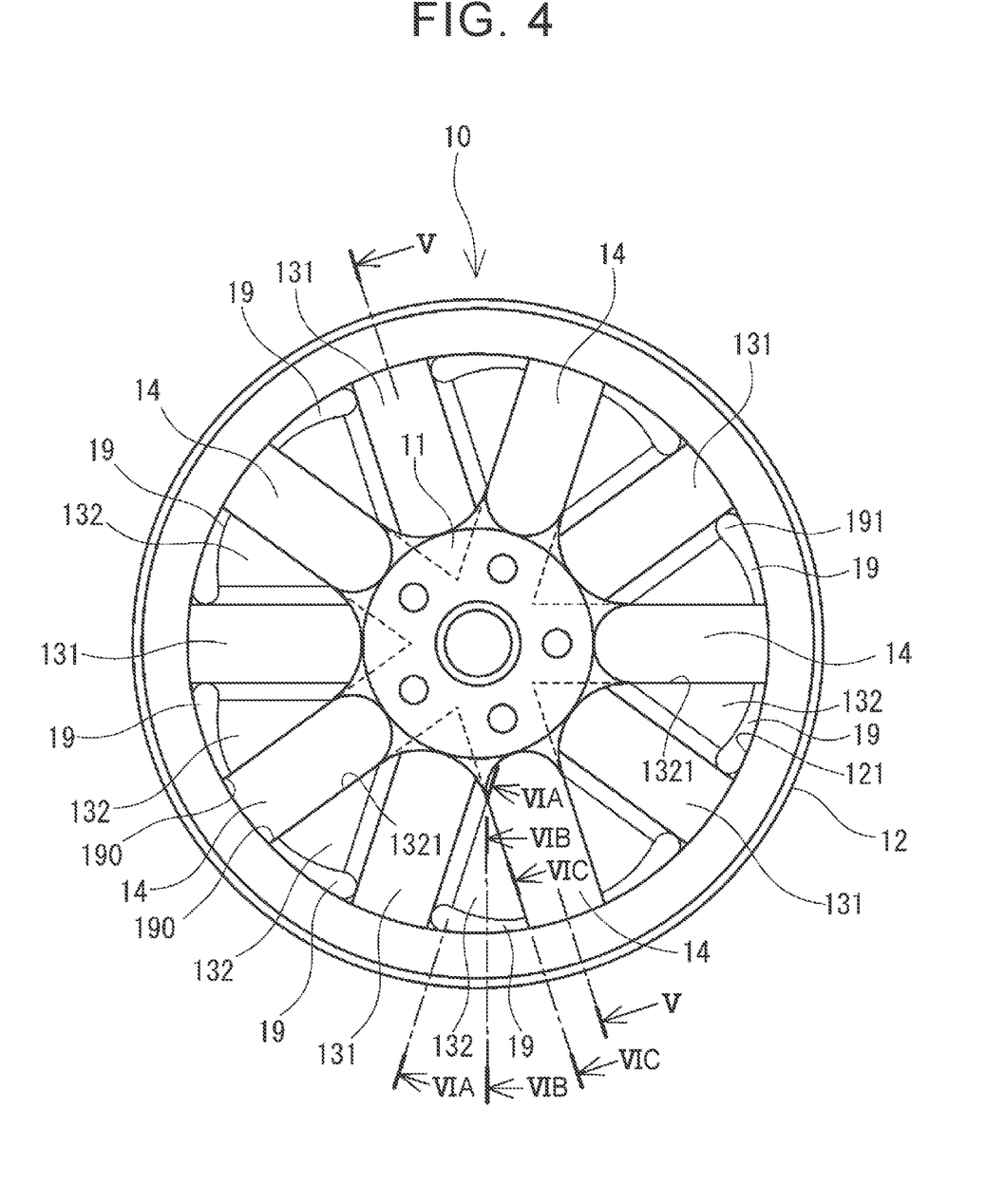
FIG. 4 is a rear view of the vehicle wheel.

As shown in FIGS. 4 and 5, a back side of the connection portion 19 extends from an end surface 1321 of the thin plate portion 132 exposed to the window portion 14 to the spoke portion 131 along the inner peripheral surface 121 of the rim portion 12 in the wheel circumferential direction. The connection portion 19 of the present embodiment is a rounded connection portion in which a concave curved surface appears on the back side, and is formed such that the wall thickness on the side connected to the rim portion 12 is thicker than the wall thickness on the side connected to the thin plate portion 132. An end 190 of the connection portion 19 on the window portion 14 side is exposed from the window portion 14.

Figure 6A:
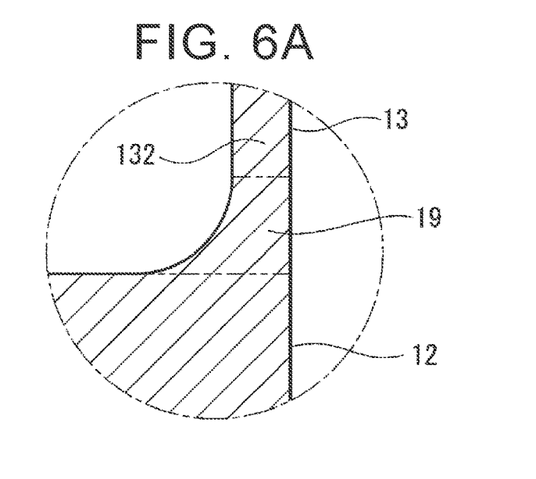
FIG. 6A is a cross-sectional view showing a change in a cross-sectional area of a connection portion, and is a cross-sectional view taken along line VIA-VIA of FIG. 4.
Figure 6B:
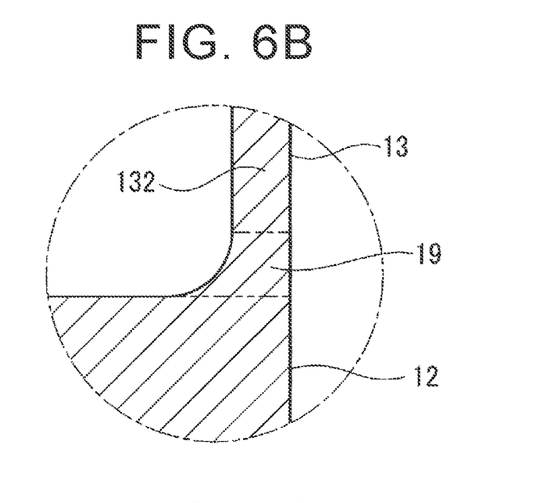
FIG. 6B is a cross-sectional view showing a change in the cross-sectional area of the connection portion, and is a cross-sectional view taken along line VIB-VIB of FIG. 4.
Figure 6C:
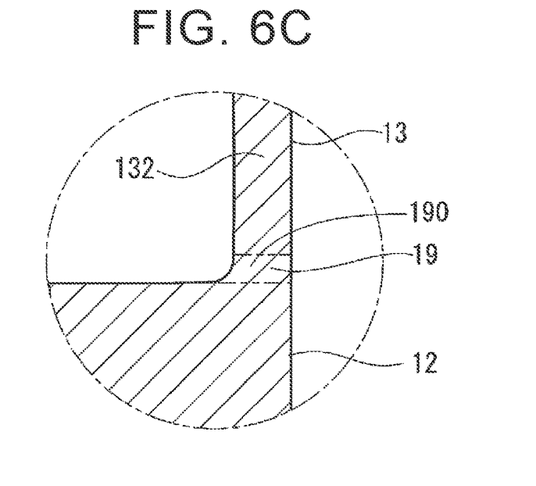
FIG. 6C is a cross-sectional view showing a change in the cross-sectional area of the connection portion, and is a cross-sectional view taken along line VIC-VIC of FIG. 4.

FIGS. 6A, 6B, and 6C show the shape of the connection portion 19 in more detail. In FIGS. 6A to 6C, the boundary between the connection portion 19, the rim portion 12, and the thin plate portion 132 is indicated by a long dashed double short dashed line. As shown in FIGS. 4 and 6A, the cross-sectional area of the connection portion 19 is larger toward the spoke portion 131 and is maximum at the portion 191 in contact with the spoke portion 131. Further, as shown in FIGS. 4 and 6C, the portion closer to the end 190 of the connection portion 19 is smaller, and the portion of the end 190 of the connection portion 19 exposed from the window portion 14 is the smallest. Further, as shown in FIGS. 4 and 6B, the cross-sectional area of the connection portion 19 is substantially medium in size at an intermediate portion between the window portion 14 and the spoke portion 131. Here, the cross-sectional area of the connection portion 19 refers to the area of the cross section of the connection portion that appears when the connection portion 19 is cut in the wheel radial direction.

Further, as shown in FIGS. 3 and 4, the width of the connection portion 19 in the wheel radial direction changes so as to be smaller toward the portion closer to the window portion 14 and larger toward the portion 191 closer to the spoke portion 131. The width of the connection portion 19 of the portion 191 connected to the spoke portion 131 is the largest, and the cross-sectional area of the connection portion 19 is the largest. Although the cross-sectional area is changed by adjusting the width of the connection portion 19, the thickness of the connection portion 19 in the wheel axis direction may be changed so as to be thinner toward the portion closer to the window portion 14 and thicker toward the portion closer to the spoke portion 131.

According to the vehicle wheel 10 of the present embodiment configured as described above, since the cross-sectional area of the connection portion 19 extending in the wheel circumferential direction is the smallest at the end 190 exposed from the window portion 14, the end 190 of the connection portion 19 is inconspicuous when the window portion 14 is seen from the front side of the disc portion 13, as shown in FIG. 1.

Since the cross-sectional area of the connection portion 19 changes so as to be larger as the distance from the window portion 14 increases, the change in the thickness of the portion from the rim portion 12 to the thin plate portion 132 is reduced, and wrinkles are less likely to be generated in the portion corresponding to the connection portion 19 corresponds to the connection portion 19 at the time of casting.

For example, in a vehicle wheel in which most of the front side surface of the disc portion to which the connection portion 19 is not applied is formed flat, it is difficult to balance measures taken against the adverse effect of the design due to the end of the connection portion and the generation of wrinkles on the front side of the disc portion. In contrast, as in the present embodiment, in the vehicle wheel 10 in which the connection portion 19 is applied, it is possible to balance measures taken against the adverse effect of the design and the generation of wrinkles on the front side of the disc portion 13, and it is possible to make most of the front side surface of the disc portion 13 be a flat surface.

Other Embodiments

The present disclosure is not limited to the above-described embodiment, and as illustrated below, may be implemented by appropriately changing the shape and the configuration of each portion without departing from the spirit of the disclosure.

In the above embodiment, the connection portion 19 is provided at the connection portion between the rim portion 12 and the thin plate portion 132. However, in another embodiment, the cross-sectional area of the connection portion between the hub portion and the thin plate portion may be changed so as to be the smallest at the end exposed from the window portion and become larger as the distance from the window portion increases.

In the above embodiment, the connection portion 19 is a rounded connection portion (see FIGS. 6A to 6C). However, in another embodiment, the connection portion 19 can be a connection portion with a corner in which an inclined surface appears on a back side of the thin plate portion 132.

In other embodiments, it is possible to arbitrarily change the number and the shape of the window portion and the thin plate portion of the disc portion.

What is claimed is:

1. A vehicle wheel comprising:
   a hub portion configured to be attached to a vehicle;
   a rim portion having a substantially cylindrical shape; and
   a disc portion connected to a front side of the rim portion and the hub portion, wherein
   the hub portion, the rim portion, and the disc portion are integrated by casting,
   the disc portion includes: (i) a plurality of window portions extending through the disc portion in a wheel axis direction, (ii) a plurality of spoke portions connected to the hub portion and the rim portion, and (iii) a plurality of thin plate portions having a thickness in the wheel axis direction that is thinner than a thickness of the spoke portions in the wheel axis direction,
   the thin plate portions extend from both sides of each of the spoke portions in a wheel circumferential direction, and the window portions are disposed between the thin plate portions of adjacent ones of the spoke portions so that the window portions, the spoke portions and the thin plate portions do not overlap when viewed from the wheel axis direction,
   each of the thin plate portions is connected to at least a part of the hub portion, the rim portion, and an adjacent one of the spoke portions via a connection portion,
   in the connection portion, a thickness of a side connected to the at least a part of the hub portion, the rim portion, and the adjacent one of the spoke portions is thicker than a thickness of a side connected to the thin plate portion, and an end of the connection portion abuts an adjacent one of the window portions, and
   a part of the connection portion located between the rim portion and the thin plate portion and extending from an adjacent one of the window portions to an adjacent one of the spoke portions has a thickness in a wheel radial direction and a cross-sectional area as viewed when the connection portion is cut in the wheel radial direction that change so that the thickness in the wheel radial direction and the cross-sectional area of the end of the connection that abuts the adjacent window portion is smaller than the thickness in the wheel radial direction and the cross-sectional area of a remainder of the part of the connection portion located between the rim portion and the thin plate portion.

2. The vehicle wheel according to claim 1, wherein the cross-sectional area of the part of the connection portion located between the rim portion and the thin plate portion increases as a distance from the adjacent one of the window portions increases.

3. The vehicle wheel according to claim 1, wherein a front side of the connection portion is flat.

4. The vehicle wheel according to claim 1, wherein each of the window portions has a pair of parallel sides that extend in straight lines from the hub portion to the rim portion.

* * * * *